(12) United States Patent
Nakashima et al.

(10) Patent No.: US 10,324,426 B2
(45) Date of Patent: Jun. 18, 2019

(54) AUTOMATED SYSTEM AND METHOD TO MANUFACTURE AERONAUTIC JUNCTION PARTS

(71) Applicant: Embraer S.A., São José dos Campos-SP (BR)

(72) Inventors: Megumi Nakashima, São José dos Campos (BR); Erik Spada Da Silva, São José dos Campos (BR); Lincoln José Lepri, São José dos Campos (BR); Pércio Roiz Saito, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 163 days.

(21) Appl. No.: 15/335,202

(22) Filed: Oct. 26, 2016

(65) Prior Publication Data

US 2018/0113425 A1 Apr. 26, 2018

(51) Int. Cl.
| | | |
|---|---|---|
| G05B 13/04 | (2006.01) | |
| B23C 3/13 | (2006.01) | |
| B64C 1/26 | (2006.01) | |
| B64F 5/10 | (2017.01) | |

(52) U.S. Cl.
CPC .............. *G05B 13/041* (2013.01); *B23C 3/13* (2013.01); *B64C 1/26* (2013.01); *B64F 5/10* (2017.01); *B23C 2215/04* (2013.01); *B23C 2220/28* (2013.01); *B23C 2260/56* (2013.01); *G05B 2219/33198* (2013.01); *G05B 2219/37355* (2013.01); *G05B 2219/45071* (2013.01)

(58) Field of Classification Search
CPC ............ B23C 2215/04; B23C 2220/28; B23C 2260/56; B23C 3/13; G05B 13/041; G05B 2219/33198; G05B 2219/37355; G05B 2219/45071
See application file for complete search history.

(56) References Cited

U.S. PATENT DOCUMENTS

| | | | | |
|---|---|---|---|---|
| 2002/0078545 | A1* | 6/2002 | Munk | ..................... B23P 21/00 29/407.01 |
| 2010/0101085 | A1* | 4/2010 | Miura | ...................... F16C 3/08 29/888.08 |
| 2011/0060552 | A1* | 3/2011 | Ono | ........................ G01B 15/00 702/167 |
| 2016/0325851 | A1* | 11/2016 | Turner | .................... B23P 15/00 |

* cited by examiner

*Primary Examiner* — Yuhui R Pan
(74) *Attorney, Agent, or Firm* — Nixon & Vanderhye P.C.

(57) ABSTRACT

Every junction part for an airplane wing is manufactured with overmaterial. Each part is measured with a laser based interferometer or other scanning technique and the "as built" measurements are compared with a model to generate a new trajectory milling program to fill or prevent gaps between parts using a points cloud and B-Spline algorithm to generate a new surface to be milled. Once the program is generated (new trajectories) and post processed, it is sent to a milling machine to perform overmaterial milling on already milled parts with overmaterial. This technique can be used to eliminate gaps between junction parts and the corresponding need for shims.

24 Claims, 14 Drawing Sheets

; KC390_DRILL_SWR2_ST1_R
; 12-16-2015 19:04:30
; PIK VERSION: TDRILL_7793_V2.9.pp
;
; STATION: 1
; MACHINE: MTORRES_TERISS_TMILL
; PROCESS: KC390_DRILL_SWR2_ST1_R
; TYPE: DRILLING
N00000 3200
N00005 ORIAXES
N00010 DK_PFTOR0=I0
N00015 DK_PFT01=5
N00020 ; OPERATION_START
N00025 OPERATION_TYPE = "DRILLING"
N00030 OPERATION_NAME = "S77_04.8_PAD4_RT"
N00035 ; LOAD_TOOL_START
N00040 TT="S77"
N00045 MG
N00050 ; LOAD_TOOL_EXT
N00055 ; LOAD_FOOTPAD_START
N00060 PAD_CHANGE(4)
N00065 ; LOAD_FOOTPAD_END
N00070 USE_DONE(D)
N00075 ;GBO_SET: AL4-A37-AL6-AL4
N00080 TRAP00F
N00085 T0D0
N00090 USE_DONE(D)
N00095 G90 G01 F0000 Z-30
N00100 G90 G01 F0000 Y2760
N00105 G90 G01 F0000 X12800
N00110 G90 G01 F0000 A-90
N00115 G90 G01 F0000 Z-145.55

FIG. 6E

AUTOMATED SYSTEM AND METHOD TO MANUFACTURE AERONAUTIC JUNCTION PARTS

CROSS-REFERENCE TO RELATED APPLICATIONS

None.

STATEMENT REGARDING FEDERALLY SPONSORED RESEARCH OR DEVELOPMENT

None.

FIELD

This example non-limiting technology relates to methods and systems for manufacturing parts, and more particularly to automatic best positioning and fitting algorithms for parts assembly. Still more particularly, the example non-limiting technology relates to using best positioning and fitting algorithms and techniques to construct aircraft parts including but not limiting to wings. Still more particularly, the example non-limiting technology provides a computer system and method providing a software controlled process that automatically measures and generates a milling program to effect machine shaping to minimize shim between junction parts.

BACKGROUND

Wings are airfoils that create lift when they move through the air. Wings can have many different designs, shapes and configurations. To achieve desired weight and performance, most large aircraft wings are constructed as hollow structures made of aluminum and possibly other materials. See FIG. 1A. The skin, typically thin aluminum sheets attached to the wing structure by rivets or other fasteners, provides the surface that is in contact with the air. Within the wing structure, ribs running from the wing's leading edge to its trailing edge (i.e., across the wing) support the skin and transfer the force from the skin to structural members within the wing structure such as longitudinal spars and stringers that run the span of the wing. See Federal Aviation Administration, Aviation Maintenance Technical Handbook, Vol. 1 ("Airframe"), Chapters 1 and 4, FAA-H-8083-31 (2012) https://www.faa.gov/regulations_policies/handbooks-_manuals/aircraft/amt_airframe_handbook/, incorporated herein by reference as if expressly set forth.

In a more specific example, FIG. 1 shows a cross-sectional view of an example non-limiting wing design including a shear joint type semi-wing junction. The FIG. 1 view shows the semi wing structure as if cut from top to bottom looking for example from the wing's leading edge to the wing's trailing edge, with the upper skin 52 defining the top wing surface, and the lower skin 54 defining the lower wing surface. Gaps between Right and Left Upper skins are shown by 61 and gaps between Right and Left Lower skin are indicated by 61'. Upper skin 52 and lower skin 54 are held and supported by structure including or consisting of shims, a rib and splices. In particular, a rib 0 (56) connects an upper T profile member 58 which attaches to the upper wing structure. Similarly, a lower T profile member 60 attaches the rib 0 (56) to the lower wing structure. Rib 0 (56) is the aircraft "Y" position reference. The T profile elements 58, 60 are in turn bonded to splice elements 62, 64. Namely, the upper T profile 58 is bonded to an upper splice 62, and the lower T profile 60 is bonded to a lower splice 64. The rib 0 (56) thus holds the upper wing structure to the lower wing structure, with splice elements 62, 64 retaining the skin 52, 54 to T profile elements 58, 60. The splice elements 62, 64 splice together different parts of the semi-wing to form a unified integrated structure.

To avoid bending and shear stress, it is desirable to have virtually no gap between upper splices 62, 64 and skin 52, 54. For example, FIG. 2 shows a simulation with gaps 76, 78 between the junction parts. In particular, there is a gap 76 between the upper splice 62 and the skin 52, and a gap 78 exists between the lower shear element 64 and adjacent structures.

Shims 66, 68, 70, 72 have conventionally been used in the past to fill such gaps between the junction parts. Thus, a shim 66 is typically disposed between upper splice 62 and skin 52; a shim 72 is typically disposed between lower splice 64 and skin 54; a shim 68 is typically disposed between skin 52 and T profile element 58; and a shim 70 is typically disposed between skin 54 and T profile element 60. See FIG. 1.

During semi-wing junction assembly, both semi-wings are aligned with a best algorithm that minimizes deviations in aerodynamic and structural specifications. As semi-wings are not identical to each other, gaps between both parts are generated and shims 66, 68, 70, 72 are manufactured and inserted to avoid bending and shear stress. It would be desirable to avoid the need for shims.

A known process for assembling parts without the need to insert shims during the process starts with gap measurement between a first part and a theoretical model. A new model of the gap insertion is created (manufactured) and placed on the tooling of the part to be joined. Once the second part has the shape of the gap and it is aligned to first part, the gap between parts is eliminated. However, such a process can have disadvantages such as:

For each shipset junction, a new insertion on the tooling must be manufactured to minimize the gap; and The production cycle (time it takes to manufacture the assembly) increases because the junction depends on measurement of the first part before manufacturing the second part.

BRIEF DESCRIPTION OF THE DRAWINGS

The following detailed description of exemplary non-limiting illustrative embodiments is to be read in conjunction with the drawings of which:

FIG. 6E shows an example generated milling program.

DETAILED DESCRIPTION OF NON-LIMITING EMBODIMENTS

Figure 1:
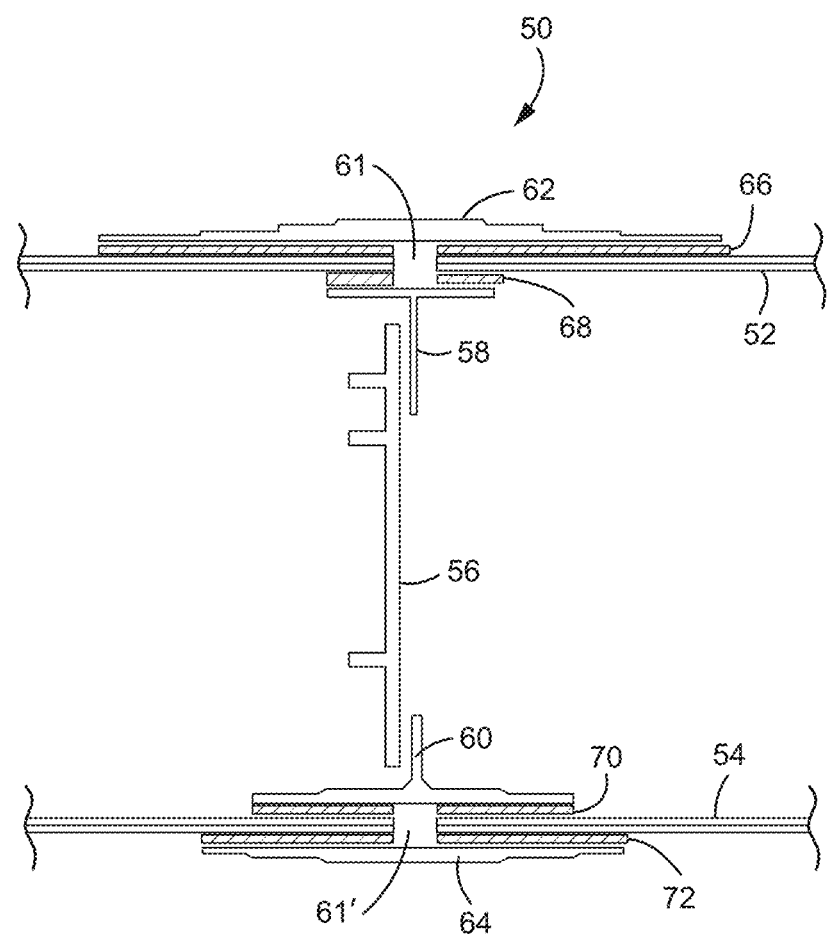
FIG. 1 shows example non-limiting parts used at the semi-wing junction including rib 0, lower splice, lower T profile, upper splice and upper T profile.
Figure 1A:
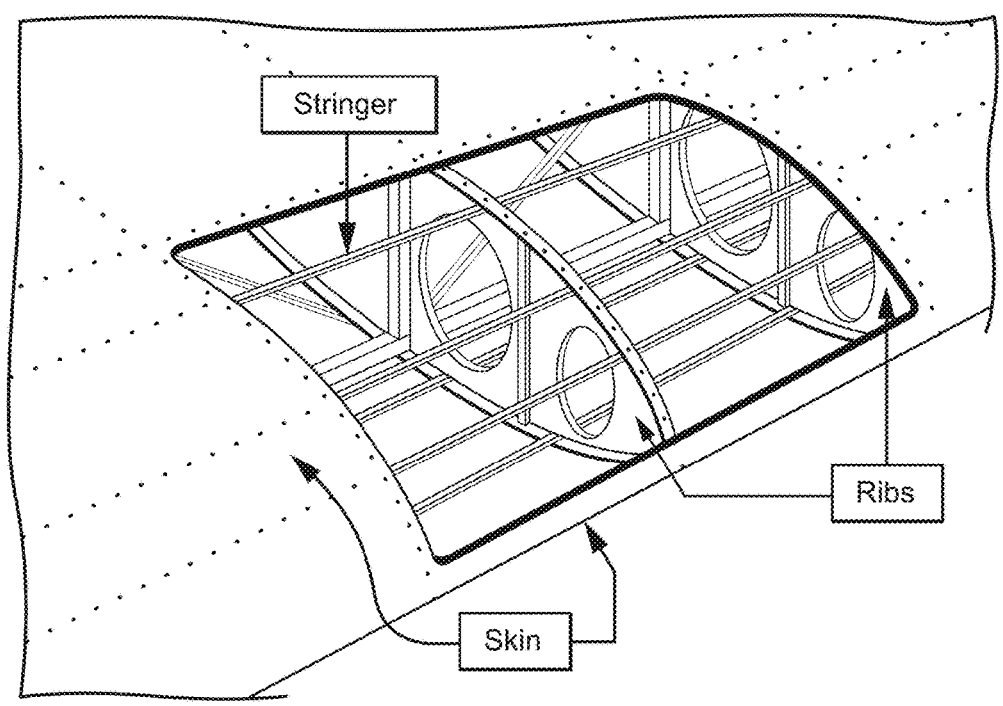
FIG. 1A shows an example wing structure.
Figure 2:
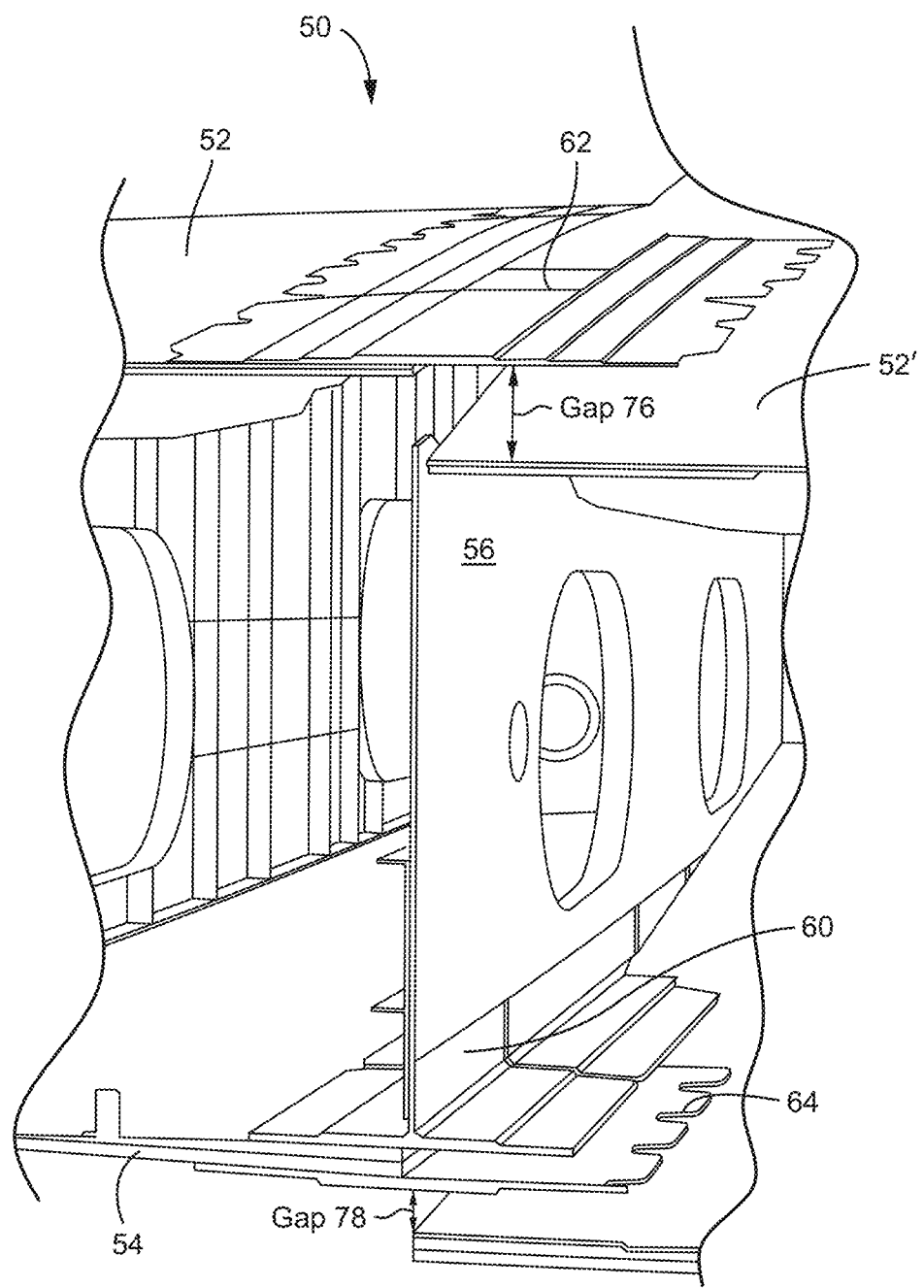
FIG. 2 shows a simulation of an upper skin and upper splice with gaps between the semi-wing joint.
Figure 3:
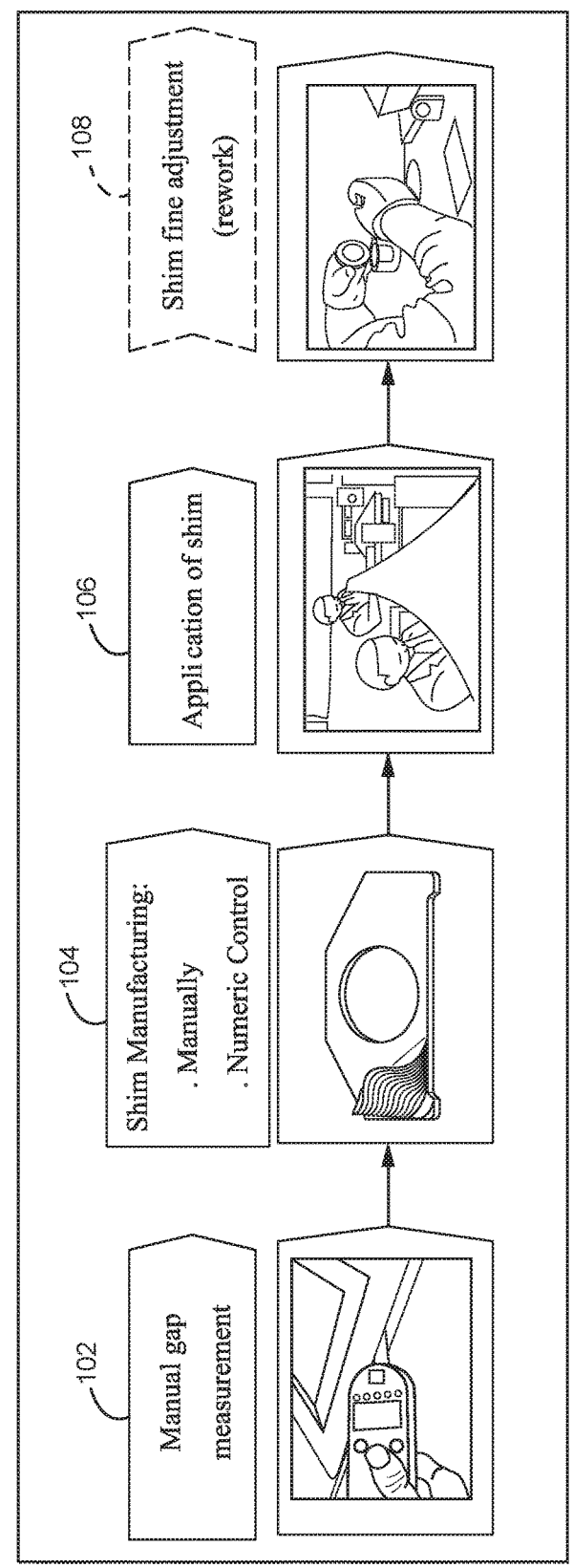
FIG. 3 shows a current process having a manual upper skin and upper splice with a gap between semi-wing joint.

While all-manual techniques were used in the past to manufacture suitable shims, more recently scanning techniques have been used to size the thickness, shape and extent of the required shims. In particular, the current process uses manual procedures to measure gaps and gather data to be sent to manufacturing analysis. See FIG. 3 block 102. Based on those extracted points, a reference surface is generated to define milling program trajectory and parameters. New shims are created for every different gap to be filled in the junction. FIG. 3 block 104. Once shims are milled, they are applied to the product (FIG. 3 block 106), checked and final adjustment is made to fit with minimum gap in the product (FIG. 3 block 108). Due to product large dimension, this manual process is not effective and inaccurate. Indeed, in this particular semi-wing junction the main stress is shear type, where shims thicker than a certain thickness are not acceptable.

Further improvements are needed.

In one example non-limiting embodiment, an automated system and method is used to integrate parts for assemblies semi-wings, after the best positioning algorithm is performed between the parts.

The example non-limiting embodiment provides a process that uses software to automatically measure and generate a milling program to machine shape to minimize shim thicknesses between parts to under a certain thickness specification such as for example 0.3 mm.

Figure 6A:
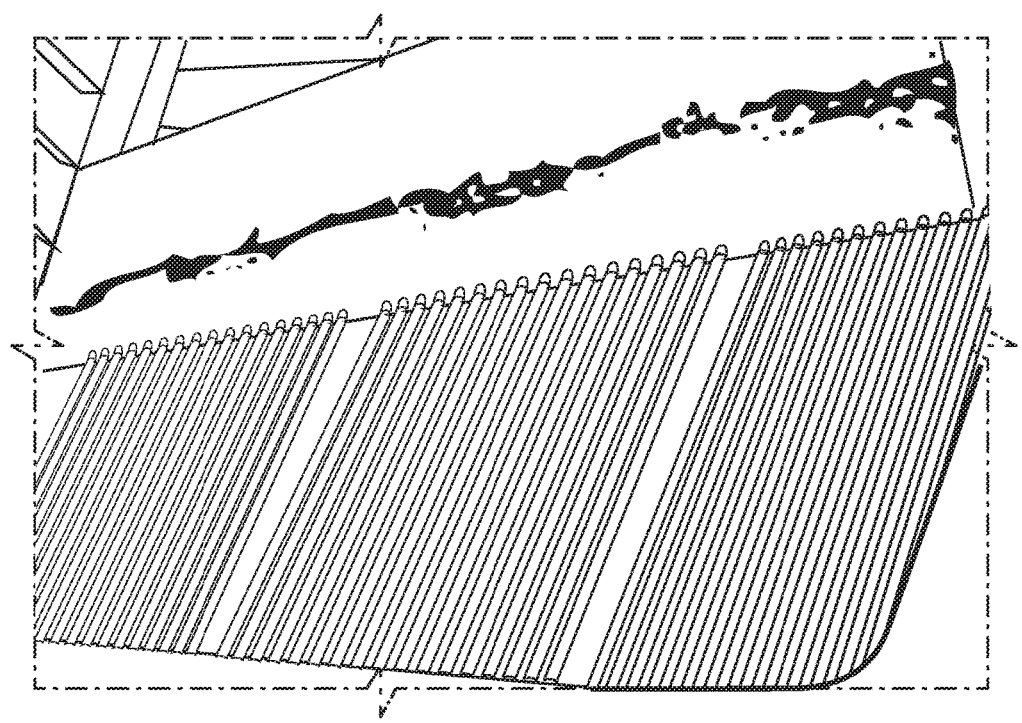
FIG. 6A shows defining a standard model.
Figure 6B:
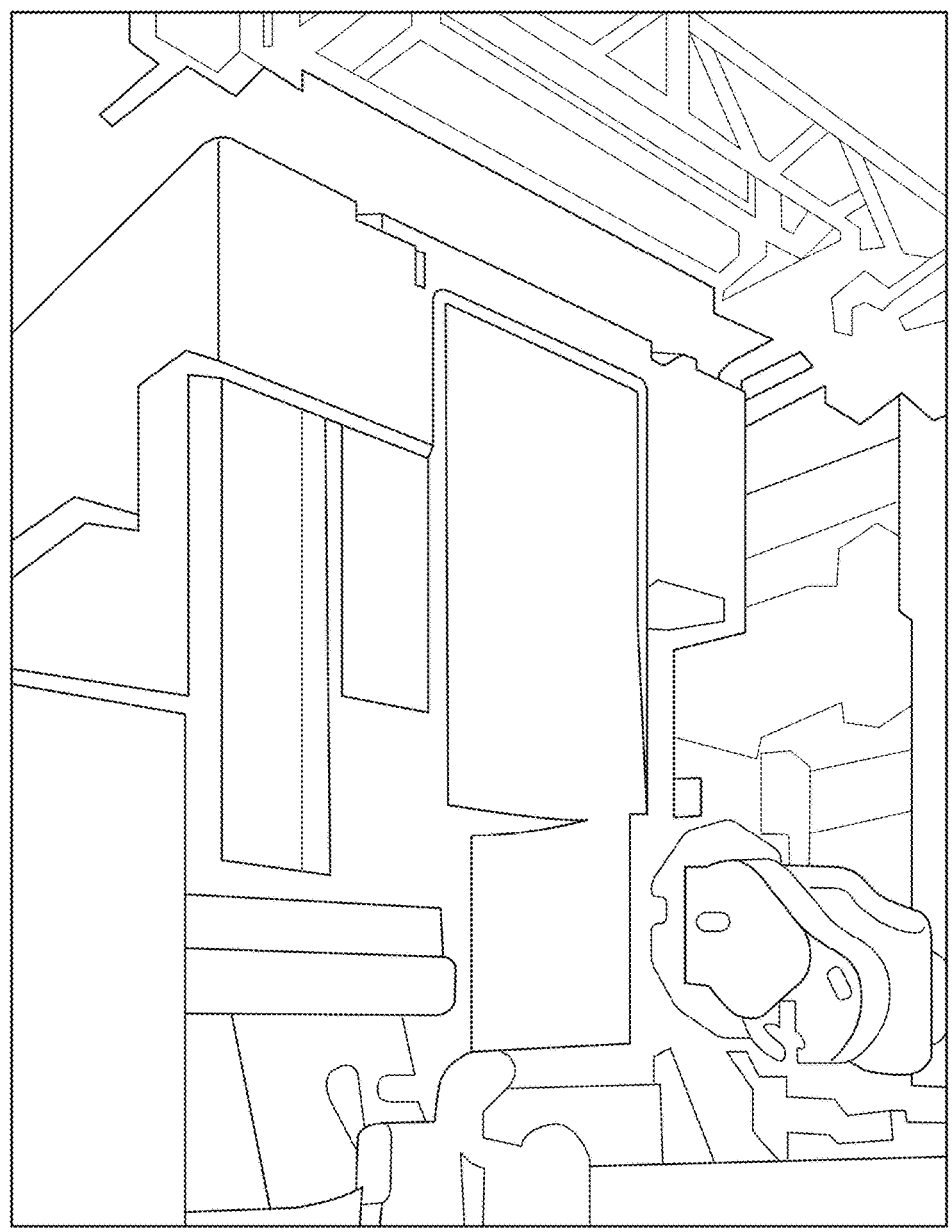
FIG. 6B shows a milling machine that can be used to manufacture parts with overmaterial.
Figure 6C:
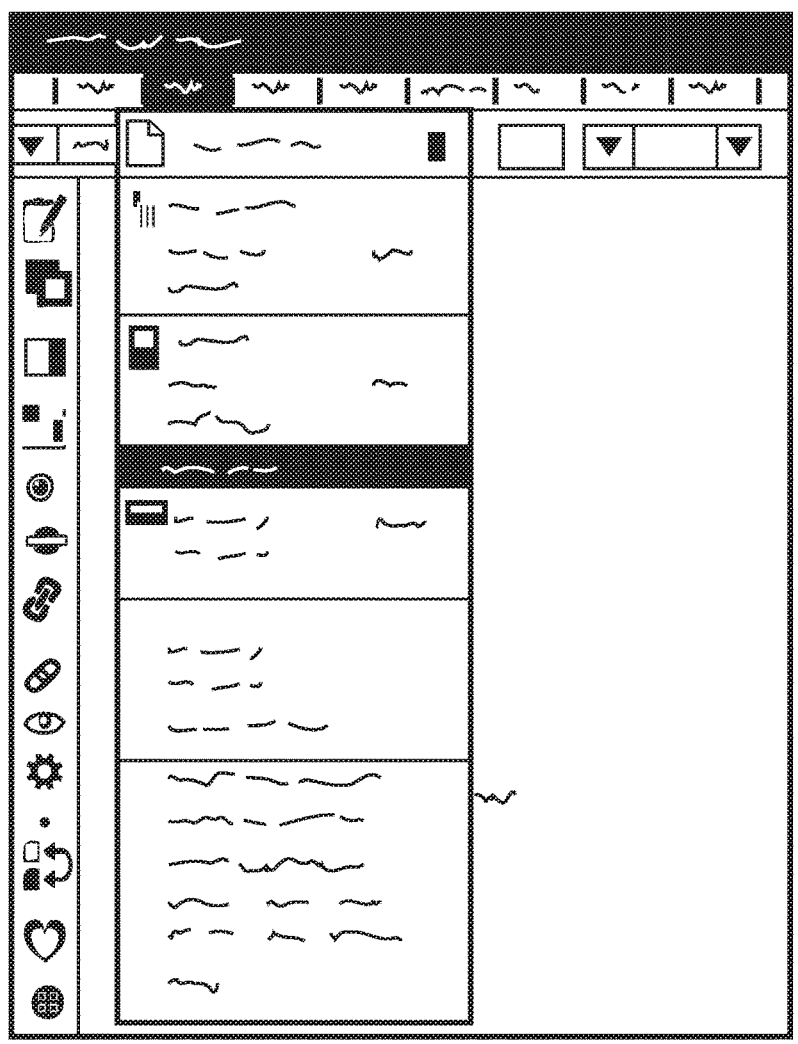
FIG. 6C shows an example user interface for the FIG. 6B milling machine.
Figure 6D:
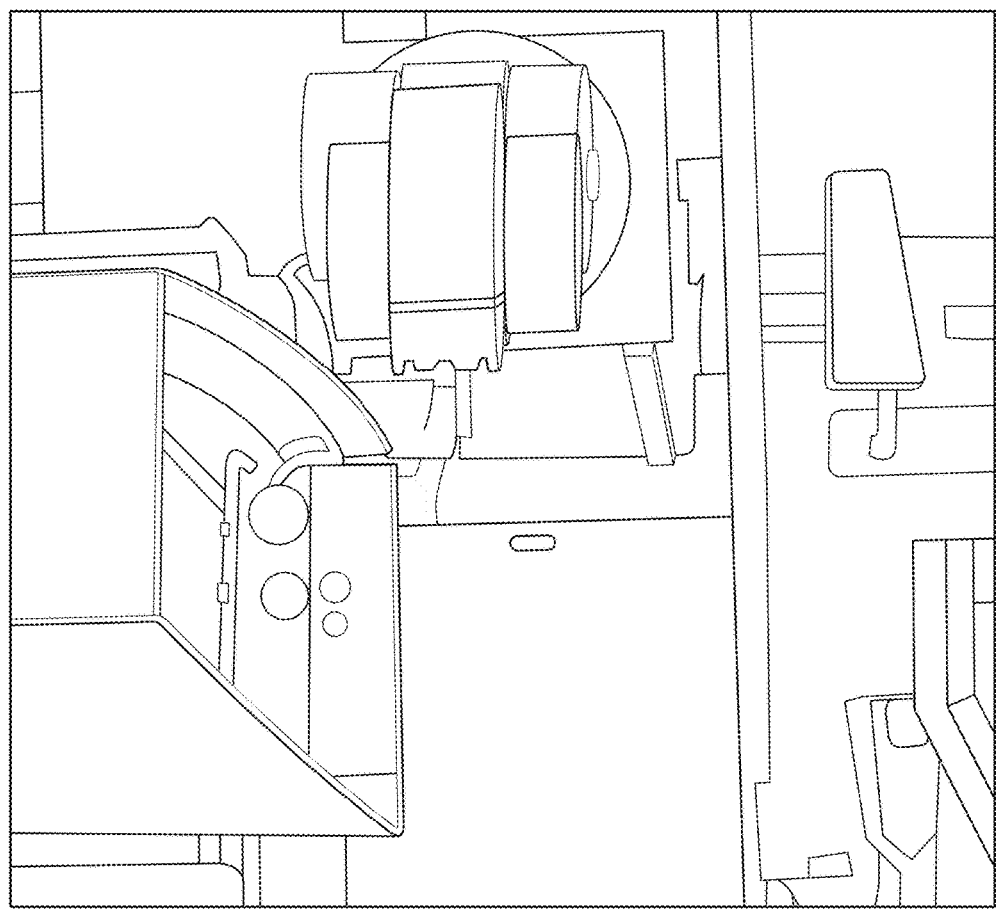
FIG. 6D shows example 5 axis automatic measurement system for making measures that can be compared to a standard.

In one example non-limiting embodiment, every junction part is manufactured with overmaterial such as e.g., 5 mm of overmaterial. Such manufacturing can be controlled and performed using a server 250, a standard model 252, a milling program 254 and a 5 axis milling machine 256 as shown in FIG. 4A and see also FIG. 6A-6C. Each part is then placed on a milling jig 264 and a milling template is set with a standard feed rate, rotation and cutting thickness. The milling machine measures, with a laser based interferometer or other scanning technique 260 (see FIG. 6D), the product reference (semi-wing) and creates a data base M with a points cloud (i.e., a cloud of points that define the surface profile based on the laser or other scanning) (266, 266')

Dedicated software stored in non-transitory memory and running on a server/processor 250 is used to compare (block 268) the measured product "as built" with the model to generate a new trajectory milling program to fill the gap between parts using a new generated surface using a Multi-Section or similar procedure (see FIG. 6G), from B-Splines. B-Splines are generated with Points Clouds measured by scanning technique 260. A well-known B-Spline algorithm can be used such as Carl de Boor's "B(asic) Spline Basics" and Hollig et al., "Approximation and Modelling with B-Splines", Society for Industrial and Applied Mathematics (Nov. 13, 2013), both incorporated herein by reference.

Figure 6F:
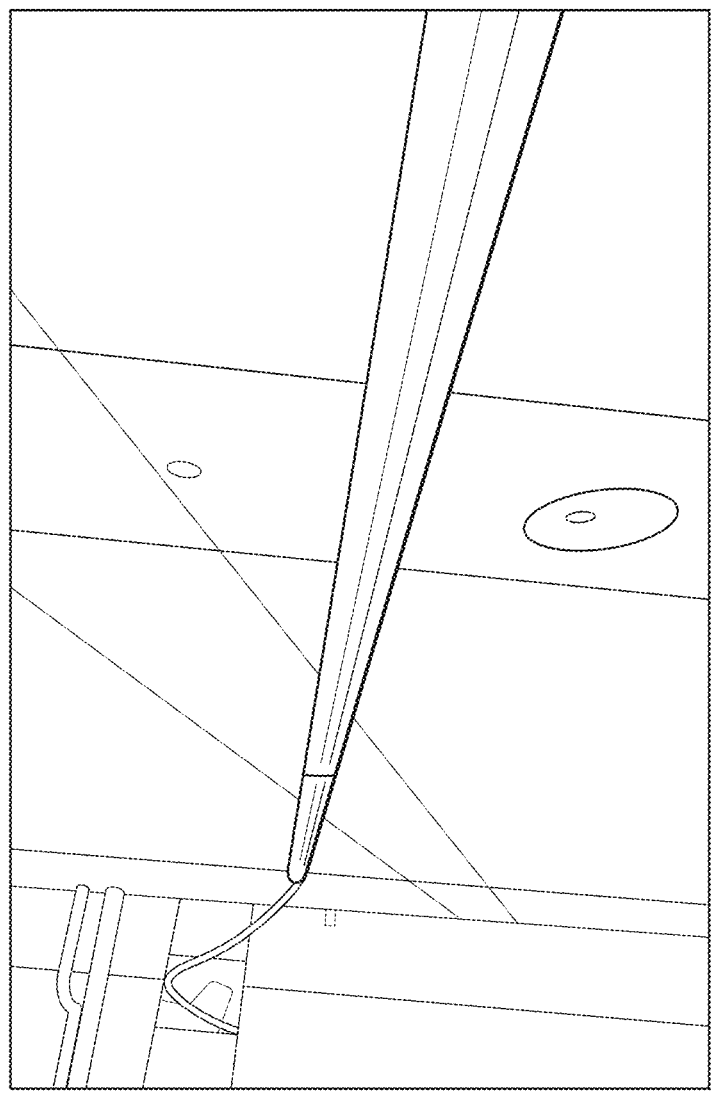
FIG. 6F shows exampling further milling of junction parts so final assembly can be with no gaps or need for shims.
Figure 6G:
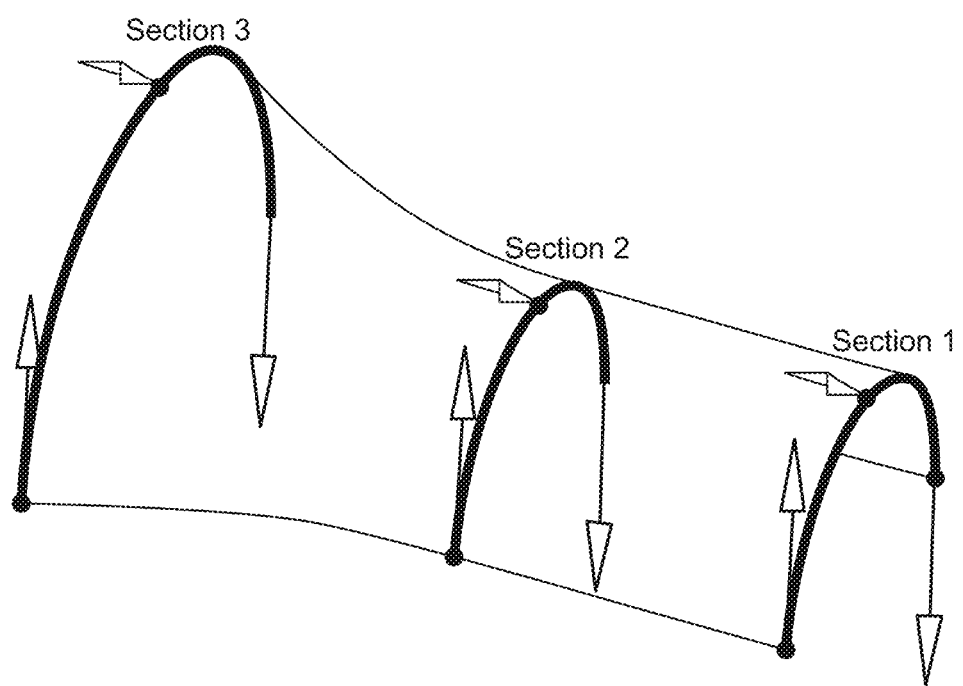
FIG. 6G shows an example new generated surface using a multi-section or similar procedure from B-Splines.

Once the program is generated (new trajectories) and post processed (e.g., translated into machine language, G code, items 254, 254', see also FIG. 6E), the code is sent to the 5-axis milling machine 256 to perform the overmaterial milling or adjustment on already milled parts with overmaterial (see FIG. 6F).

After final milling, the 5-axis milling machine drills four reference or reference holes for each part that will be the same reference done by the same 5-axis milling machine on the semi-wings. The milled part is placed on the semi-wing through reference holes drilled previously, and the machine proceeds with the drilling process.

Figure 4:
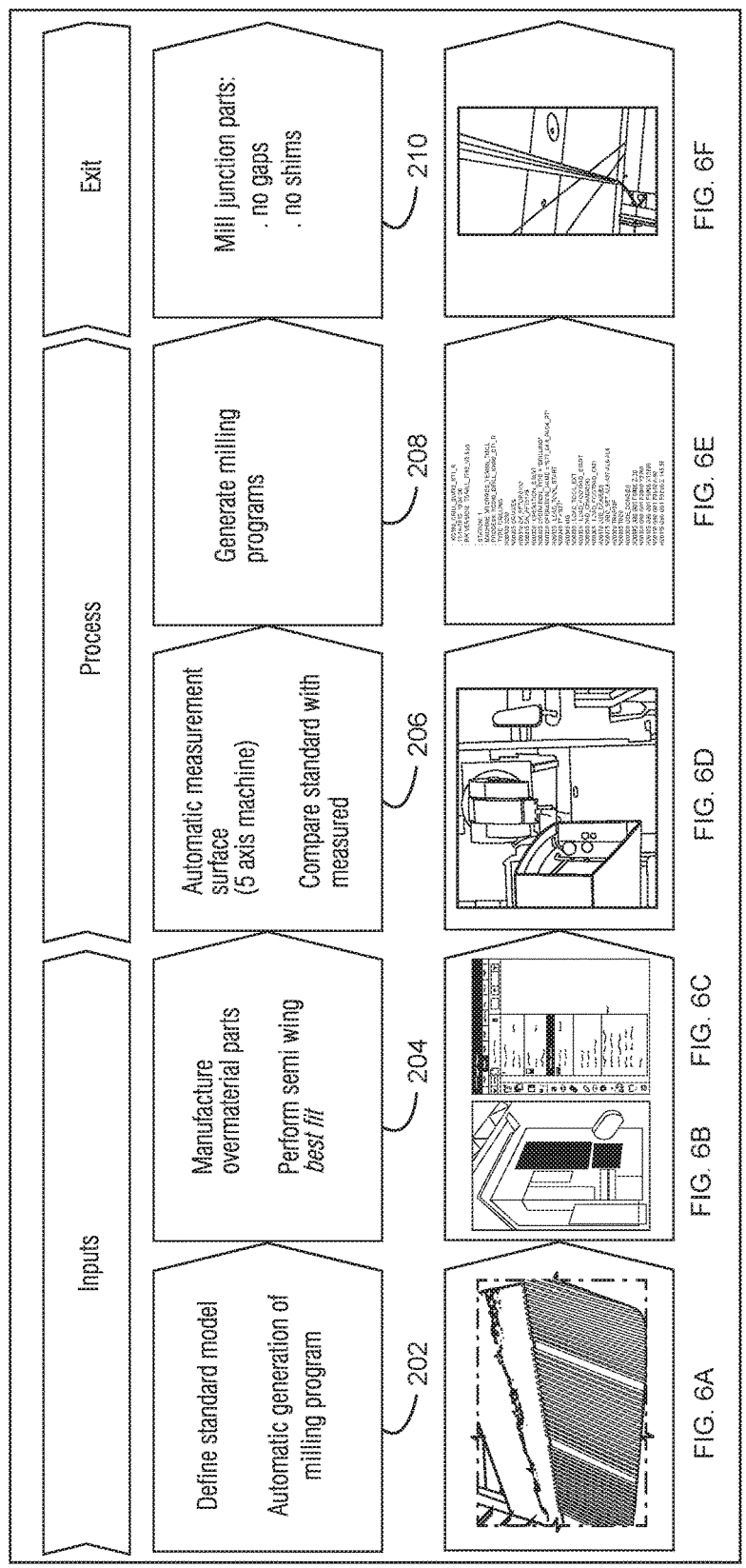
FIG. 4 shows an improved process sequence of a non-limiting embodiment including automatic measurement, automatic milling program generation and final milling.
Figure 4A:
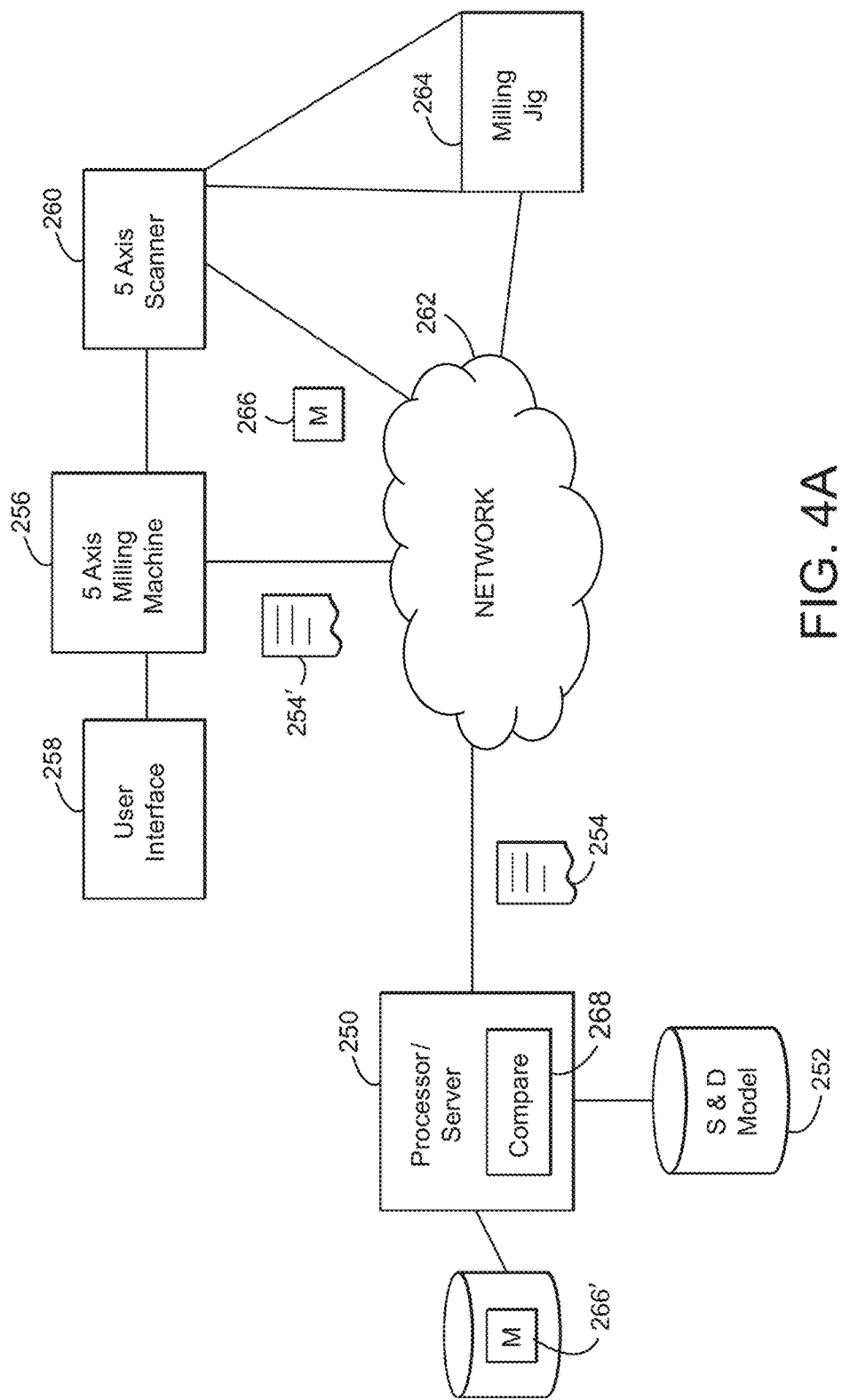
FIG. 4A shows an example non-limiting system configuration.

FIG. 4 shows this overall process in more detail. Initially, a standard model is defined (block 202) and a milling program is automatically generated. The parts are then manufactured with overmaterial as explained above, and a best fit algorithm is performed to fit the semi wing parts together (block 204). The inner and outer surface of the semi wings are measured (scanned) automatically with a 5-axis machine and models defining the standard are compared with the measured surfaces (block 206). Milling programs for additional milling operations are generated for each part (block 208) and used to mill junction parts that can be assembled with no gaps and thus no shims (block 210).

Figure 5:
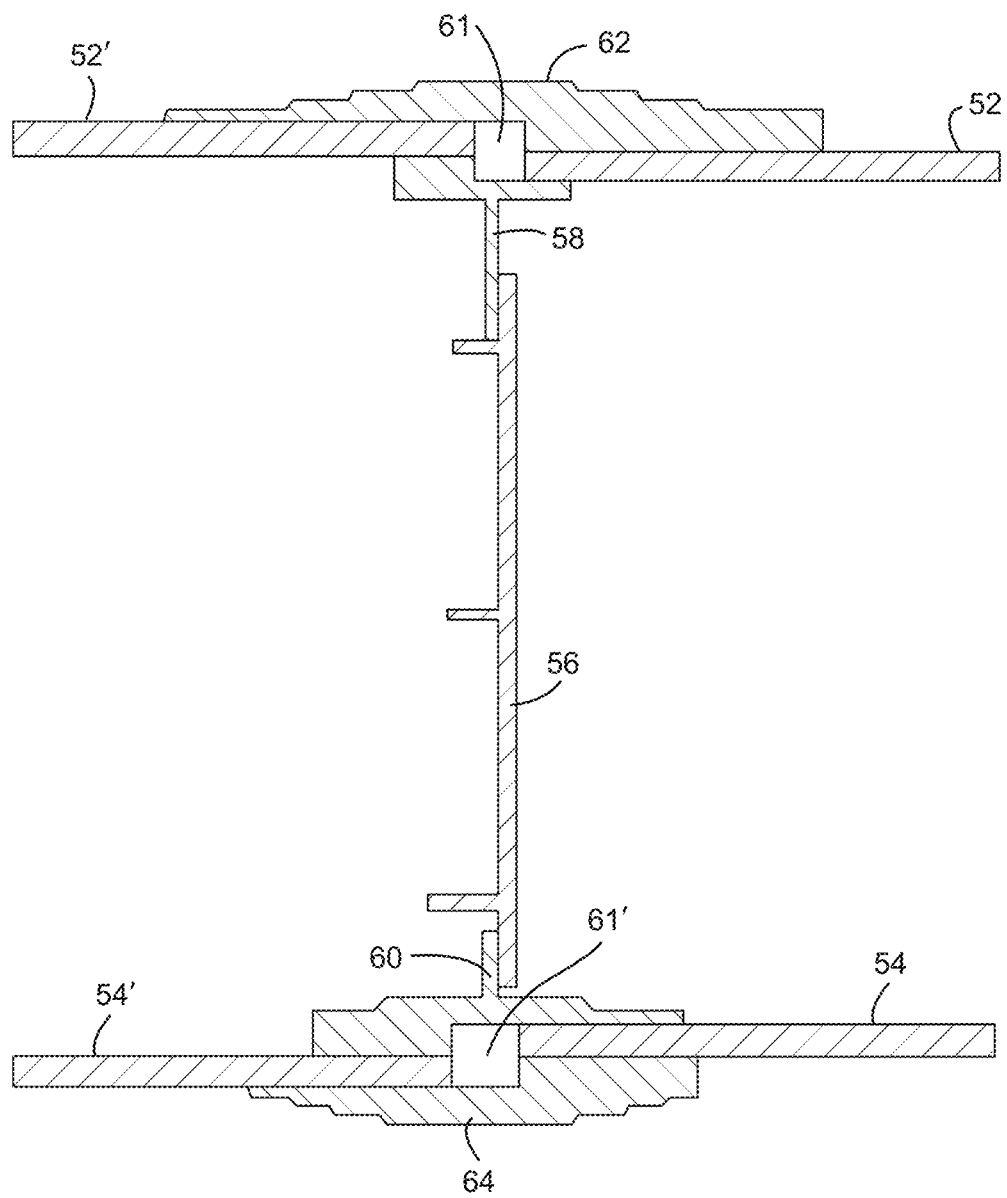
FIG. 5 shows a front view of a final result of Splice and T Profile after automatic junction of semi-wing process.

Benefits of the example non-limiting embodiment include for example:
1. Cycle reduction:
   a. Overmaterial parts are fine adjusted after measuring the junction parts in the shop floor. Once it is approved, it is sent.
   b. Automatic measurement of the semi-wing surface.
   c. Automatic milling program generation.
2. Structural enhancement:
   a. No shims insertion due to shape generated on the overmaterial part (see FIG. 5). This avoids high shear stress.
   b. Minimum gap between parts below 0.3 mm.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of manufacturing junction parts for an aircraft wing of the type comprising an upper wing structure and a lower wing structure, the method comprising:
   (a) milling aircraft wing junction parts with overmaterial, including configuring the junction parts to interconnect the upper wing structure to the lower wing structure via a rib at a semi-wing junction area extending between the upper and lower wing structures;
   (b) scanning the junction parts;
   (c) using at least one processor, comparing the parts scans with a model;
   (d) based on the comparison between the parts scans and the model, generating a trajectory milling program to fill or prevent gaps between the junction parts; and
   (e) further milling the junction parts using the trajectory milling program to remove overmaterial, thereby minimizing gaps between parts and eliminating a corresponding need for shimming to fill said gaps,
   wherein the junction parts are configured to connect upper and lower skins of the aircraft's wing to the rib.

2. The method of claim 1 wherein scanning comprises scanning the junction parts with a laser based interferometer.

3. The method of claim 1 wherein the comparing uses a B-Spline algorithm.

4. The method of claim 1 wherein the scanning creates a data base with points clouds that define the surface profiles of the junction parts based on laser or other scanning.

5. The method of claim 1 wherein the processor automatically generates a milling program to machine shape the junction parts to minimize shim thicknesses between the junction parts to under a certain thickness specification.

6. The method of claim 5 wherein the thickness specification is 0.3 mm.

7. The method of claim 1 wherein the manufacturing mills the junction parts with 5 mm or less of overmaterial, and the milling mills already-milled junction parts to minimize shim thickness to less than 0.3 mm.

8. The method of claim 1 wherein the method reduces cycle time by fine adjusting the overmaterial after measuring the junction parts inside the semi-wing junction area using automatic scanning and automatic milling program generation and performing a B-Spline algorithm to generate multi-section surfaces.

9. The method of claim 1 wherein the method enhances structure by inserting no shims due to shape generated on the junction parts thereby avoiding high shear stress and providing a minimum gap between parts below 0.3 mm.

10. A system for manufacturing parts for aircraft wings of the type including upper and lower wing structures, the system comprising:
  a milling machine programmed to mill aircraft wing junction parts with overmaterial, the junction parts being configured to interconnect an upper wing structure with a lower wing structure via a vertically extending rib at a semi-wing junction area;
  a scanner configured to measure an inner surface and an outer surface of the semi-wing junction area; and
  at least one processor operatively coupled to the scanner, the at least one processor comparing the measurements with a model and based on the comparison, generating a trajectory milling program to fill gaps between the junction parts;
  the same or different milling machine being configured to use the generated trajectory milling program to again mill the junction parts thereby removing overmaterial to minimize gaps between parts and eliminate the corresponding need for shimming,
  wherein the junction parts are configured to connect upper and lower skins of the aircraft's wing to the rib.

11. The system of claim 10 wherein the scanner comprises a laser based interferometer.

12. The system of claim 10 wherein the processor is configured to compare using a B-Spline algorithm.

13. The system of claim 10 wherein the scanner creates a data base with points clouds that define the surface profiles of the parts based on the scanner.

14. The system of claim 10 wherein the processor automatically generates a milling program to machine shape to minimize shim thicknesses between junction parts to under a certain thickness specification.

15. The system of claim 14 wherein the thickness specification is 0.3 mm.

16. The system of claim 10 wherein the milling machine initially provides the junction parts with 5 mm or less of overmaterial.

17. The system of claim 10 wherein the system is further configured to reduce cycle time by fine adjusting the overmaterial after measuring the semi-wing junction area using automatic measurement and automatic milling program generation.

18. The system of claim 10 wherein the system is configured to enhance structure by inserting no shims due to shape generated on the junction parts thereby avoiding high shear stress and providing a minimum gap between parts below 0.3 mm.

19. The method of claim 1, wherein the junction parts are configured to connect to the upper and lower skins of the aircraft's wing and to upper and lower ends of the rib.

20. The method of claim 19, wherein the junction parts include splices, the splices being configured to connect to the upper and lower skins of the aircraft's wing.

21. The method of claim 19, wherein the junction parts include T-profiles, the T-profiles being configured to connect to the upper and lower ends of the rib.

22. The system of claim 10, wherein the junction parts are configured to connect to the upper and lower skins of the aircraft's wing and to upper and lower ends of the rib.

23. The system of claim 22, wherein the junction parts include splices, the splices being configured to connect to the upper and lower skins of the aircraft's wing.

24. The system of claim 22, wherein the junction parts include T-profiles, the T-profiles being configured to connect to the upper and lower ends of the rib.

* * * * *